3,046,137
PHOTOSENSITIVE RESINOUS COMPOSITIONS

Franklin F. Ogden, Wilmington, Del., assignor to Monsanto Chemical Company, St. Louis, Mo., a corporation of Delaware
No Drawing. Filed Dec. 22, 1955, Ser. No. 554,646
5 Claims. (Cl. 96—115)

This invention relates to photosensitive resinous compositions and more particularly to photosensitive polyvinyl halide compositions.

Photosensitive polyvinyl halide compositions are a recent development. Image development in such compositions is based upon the dehydrohalogenation of the halogenated resin to form chromophore groups. While the photosensitive resinous films of the prior art have many present and potential utilities, much wider application would be made possible if exposure time to produce the image could be significantly shortened. In other words, an increased photosensitivity of such films is highly desirable.

It is an object of this invention to provide novel photosensitive polyvinyl halide compositions.

It is a further object of this invention to provide novel photosensitive polyvinyl halide compositions characterized by a degree of photosensitivity significantly greater than heretofore obtainable.

Additional objects will become apparent from the description of the invention.

Heretofore photosensitive polyvinyl halide compositions comprised a vinyl halide polymer capable of dehydrohalogenation with the formation of at least five conjugated double bonds per molecule and a minor amount of an aluminum compound which in the presence of HCl is converted to aluminum chloride. These compositions also contain various plasticizers, stabilizers and fillers, depending upon the physical properties desired in the ultimate film.

It has now been discovered that the photosensitivity of such compositions as described above can be significantly increased if there is incorporated therewith a minor amount of a vinyl chloride telomer having the formula

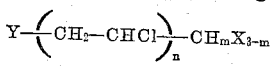

wherein Y is hydrogen or halogen, X is halogen, $n$ is an integer from 2 to 50 and $m$ may vary from 0 to 2.

The following examples illustrate the invention:

EXAMPLE I

A composition comprising 50 g. of vinyl chloride-vinylidene chloride copolymer resin, 25 g. solvent, 12 g. dioctyl phthalate and 1 g. aluminum oxide is thoroughly mixed, poured onto a plate and a 4 mil film drawn down. The film is cured at about 350° F. for about 1 minute. The film is then masked with a negative and exposed to actinic light for about 10 minutes. The film is then placed in an oven at 350° F. for 10 minutes, after which time an image corresponding to the negative is formed.

EXAMPLE II

The procedure set forth in Example I is repeated using in place of the 50 g. of vinyl chloride-vinylidene chloride copolymer resin, a resin mixture containing 45 g. vinyl chloride-vinylidene chloride copolymer resin and 5 g. of a telomer of vinyl chloride and carbon tetrachloride having a molecular weight of approximately 2100. The film is masked with the same negative as in Example I, but significantly less exposure time is required to produce an image of the same intensity.

The procedure described in Example II is repeated using in place of the 45 g. of vinyl chloride-vinylidene chloride copolymer resin, 45 g. of polyvinyl chloride, 45 g. of polyvinylidene chloride and 45 g. of vinyl chloride-vinyl acetate copolymer. Results comparable to those obtained in Example II are obtained when each of the above mentioned resins are used in conjunction with the vinyl chloride telomer. Similar results are also obtained using the telomers wherein the vinyl halide polymer is telomerized with dichloromethane.

The compositions set forth in the preceding examples can be varied substantially without departing from the scope of this invention. Any aluminum compound which in the presence of HCl readily forms aluminum chloride can be used in these compositions. Aluminum oxide and the aluminum soaps are particularly preferred. The aluminum compound can be used over a wide range of concentrations. Generally only a minor amount is used. Those concentrations wherein the ratio of aluminum to resin reaches from 1:500 to 1:50 are particularly preferred.

A wide variety of plasticizers may be used in these compositions in order to impart the desired degree of flexibility. Plasticizers which can be used in this application include di-2-ethylhexylphthalate, tricresyl phosphate, tributyl Cellosolve phosphate, triethylene glycol di-2-ethylhexoate and di-2-ethylhexyl adipate. Plasticizer concentration can vary from about 0 to about 70 parts by weight per 50 parts by weight of resin, depending upon the film characteristics desired.

The photosensitive compositions of this invention can be compounded by any convenient method well known to those skilled in the art of compounding synthetic resinous compositions. Films may be solvent cast, or they may be formulated directly on a differential roll mill and then calendered to the desired thickness. The conventional pastisol technique is also useful in preparing the novel compositions of this invention.

To create an image on the photosensitive resinous compositions of this invention, the compositions may be exposed under any source of actinic light. While obvious factors will determine the amount of exposure necessary to form an image, with the proper actinic light source exposure of as little as 10 seconds are necessary to produce an image of low optical density. The fixing operation can be carried out over a wide temperature range. Generally temperatures in the range of from 250° F. to 450° F. applied over a period of from 1 to 30 minutes are suitable.

The vinyl chloride telomers used in this invention are represented by the formula

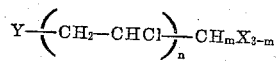

wherein Y is hydrogen or halogen, X is halogen, $n$ is an integer from 2 to 50 and $m$ may vary from 0 to 2. Vinyl chloride-carbon tetrachloride telomers having the following formula:

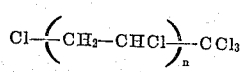

wherein $n$ can vary from 2 to 50, are particularly preferred. These materials can be obtained by reacting vinyl chloride with a halomethane in the presence of a free radical type catalyst. The following example illustrates a method of preparing these materials.

EXAMPLE III

Glass containers were charged with the quantities of carbon tetrachloride and benzoyl peroxide catalyst indicated in Table I and liquid vinyl choride in the tabulated amounts was then poured into each. The containers were sealed and placed in a tumbling water bath maintained at 80° C. for approximately four hours. In no case was there any pressure remaining in any of the containers, demonstrating that all the vinyl chloride had reacted in each case. At the end of the reaction period, the containers were opened and excess carbon tetrachloride was removed by distillation at 65° C. and at a pressure of 20 mm. Hg absolute. The specific viscosity of each of the polymers formed was then determined by dissolving 0.4000±0.0002 g. in 40 ml. of methyl ethyl ketone and passing said solution at 30.02±0.02° C. through a No. 50 Ostwald viscosimeter. Using specific viscosity as a relative measure of the molecular weight, molecular weights for the polymers were calculated. Resulting data are also recorded in Table I.

*Table I.—Vinyl Chloride Telomers*

| Run No. | 1 | 2 | 3 | 4 | 5 | 6 |
|---|---|---|---|---|---|---|
| Carbon tetrachloride: | | | | | | |
| Weight, g. | 135.84 | 146.10 | 149.59 | 177.78 | 199.70 | 200.80 |
| Moles | 0.883 | 0.950 | 0.973 | 1.156 | 1.298 | 1.310 |
| Vinyl Chloride (VCM): | | | | | | |
| Weight, g. | 44.16 | 33.22 | 30.41 | 22.22 | 20.30 | 19.20 |
| Moles | 0.707 | 0.532 | 0.487 | 0.355 | 0.321 | 0.310 |
| Catalyst, g.[1] | 1.1040 | 0.8475 | 0.7603 | 0.5555 | 0.5075 | 0.4800 |
| Mole Ratio, CCl$_4$/VCM | 1.25/1 | 1.78/1 | 2.00/1 | 3.25/1 | 4.0/1 | 4.22/1 |
| Telomer Recovered, g. | 49.0 | 39.7 | 36.7 | 25.1 | 23.8 | 22.7 |
| Specific Viscosity | 0.0820 | 0.0649 | 0.0580 | 0.0410 | 0.0378 | 0.0347 |
| Molecular Weight | 2100 | 1570 | 1370 | 890 | 810 | 730 |
| Appearance | (2) | (2) | (2) | (3) | (3) | (3) |

[1] Approximately 2.5% by weight of vinyl chloride.
[2] White powder.
[3] Highly viscous paste.

The concentration of the telomers used in the novel photosensitive resinous compositions of this invention is subject to substantial variation. Preferably from about 1 part by weight to about 10 parts by weight of the telomer per 100 parts by weight of the vinyl halide polymer is used. Generally only minor amounts of the telomer are used, but higher amounts, for example as high as 25 parts by weight of the telomer per 100 parts by weight of the vinyl halide resins, can be used if desired.

What is claimed is:

1. A resinous composition comprising a vinyl chloride polymer, a minor amount of a vinyl chloride telomer having the formula

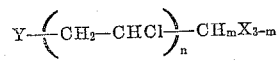

wherein Y is selected from the group consisting of hydrogen and halogen, X is halogen, $n$ is an integer from 2 to 50 and $m$ is a number from 0 to 2, and a minor amount of an aluminum compound which in the presence of HCl yields aluminum chloride.

2. A resinous composition as described in claim 1 wherein the aluminum compound is aluminum oxide.

3. A resinous composition as described in claim 2 wherein the vinyl chloride telomer has the formula

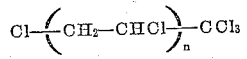

wherein $n$ is an integer from 2 to 50.

4. A resinous composition as described in claim 3 wherein the vinyl chloride polymer is a vinyl chloride-vinylidene chloride copolymer.

5. A resinous composition as described in claim 3 wherein the vinyl chloride polymer is polyvinyl chloride.

References Cited in the file of this patent

UNITED STATES PATENTS

| | | |
|---|---|---|
| 1,587,274 | Beebe | June 1, 1926 |
| 2,099,297 | Clement | Nov. 16, 1937 |
| 2,395,292 | Peterson et al. | Feb. 6, 1946 |
| 2,400,800 | Zuschlag | May 21, 1946 |
| 2,402,137 | Hanford et al. | June 18, 1946 |
| 2,432,287 | Cramer | Dec. 9, 1947 |
| 2,433,015 | Roland et al. | Dec. 23, 1947 |
| 2,468,208 | Kharasch | Apr. 26, 1949 |
| 2,478,390 | Hanford et al. | Aug. 9, 1949 |
| 2,551,639 | Feasley et al. | May 8, 1951 |
| 2,584,306 | Theobald | Feb. 5, 1952 |
| 2,712,996 | Elliott | July 12, 1955 |
| 2,789,052 | Elliott | Apr. 16, 1957 |

FOREIGN PATENTS

| | | |
|---|---|---|
| 649,555 | Great Britain | Jan. 13, 1951 |

OTHER REFERENCES

Schildknecht: Polymer Processes—High Polymers, vol. X (copyright 1956), pages 177–180.